(12) United States Patent
Tang et al.

(10) Patent No.: US 11,544,523 B2
(45) Date of Patent: Jan. 3, 2023

(54) CONVOLUTIONAL NEURAL NETWORK METHOD AND SYSTEM

(71) Applicant: HIMAX TECHNOLOGIES LIMITED, Tainan (TW)

(72) Inventors: Ti-Wen Tang, Tainan (TW); Yun-Sheng Lin, Tainan (TW)

(73) Assignee: Himax Technologies Limited, Tainan (TW)

( * ) Notice: Subject to any disclaimer, the term of this patent is extended or adjusted under 35 U.S.C. 154(b) by 890 days.

(21) Appl. No.: 16/424,376

(22) Filed: May 28, 2019

(65) Prior Publication Data

US 2020/0380334 A1    Dec. 3, 2020

(51) Int. Cl.
 *G06N 3/04* (2006.01)
 *G06F 17/15* (2006.01)
 *G06N 3/063* (2006.01)
(52) U.S. Cl.
 CPC ............... *G06N 3/04* (2013.01); *G06F 17/15* (2013.01); *G06N 3/0454* (2013.01); *G06N 3/063* (2013.01)

(58) Field of Classification Search
 CPC ........ G06N 3/04; G06N 3/0454; G06N 3/063; G06F 17/15
 See application file for complete search history.

(56) References Cited

U.S. PATENT DOCUMENTS

2017/0161604 A1* 6/2017 Craddock ............ G06N 3/0454
2018/0350110 A1* 12/2018 Cho ..................... G06V 10/454
2019/0278994 A1* 9/2019 Bumpas ................. G06N 3/08

* cited by examiner

*Primary Examiner* — Stephen G Sherman
(74) *Attorney, Agent, or Firm* — Donald E. Stout; Stout, Uxa & Buyan, LLP

(57) ABSTRACT

A convolutional neural network (CNN) method includes determining a temporary buffer layer, which is located between a first layer and a final layer of a CNN system; performing convolutional operations from the first layer to the determined temporary buffer layer of the CNN system in a first stage to generate a feature map line according to partial input data of layers before the temporary buffer layer; and performing convolutional operations from the temporary buffer layer to the final layer of the CNN system in a second stage to generate a feature map.

18 Claims, 2 Drawing Sheets

CONVOLUTIONAL NEURAL NETWORK METHOD AND SYSTEM

BACKGROUND OF THE INVENTION

1. Field of the Invention

The present invention generally relates to a neural network, and more particularly to a two-stage convolutional neural network (CNN) method and system with a line-based feature map.

2. Description of Related Art

A convolutional neural network (CNN) is one of deep neural network that uses convolutional layers to filter inputs for useful information. The filters in the convolutional layers may be modified based on learned parameters to extract the most useful information for a specific task. The CNN may commonly be adaptable to classification, detection and recognition such as image classification, medical image analysis and image/video recognition.

A convolutional operation, composed of multiplication-accumulation operations between model weightings and feature map, is a data-intensive computation in CNN. In hardware implementation, massive feature map data are required to be buffered in a memory such as static random-access memory (SRAM) to ensure that CNN hardware accelerator could fetch the feature map data immediately for convolutional operation in a next layer. As the feature map size is proportional to input image size, more SRAM is thus required for the input image with larger size.

Single shot detectors (SSD) such as you only look once become more popular due to their high frame rate and high performance, and outperform sliding-window-based detectors. In a traditional CNN with SSD, SRAM three times the size of the feature map (or input image data) is required for the hardware accelerator to ensure in the worst case that each feature map could be properly stored. As a result, the traditional CNN with SSD disadvantageously requires lots of SRAM to achieve its high frame rate and high performance.

A need has thus arisen to propose a novel convolutional neural network (CNN) method and system with reduced memory without sacrificing frame rate and performance.

SUMMARY OF THE INVENTION

In view of the foregoing, it is an object of the embodiment of the present invention to provide a two-stage convolutional neural network (CNN) method and system with a line-based feature map capable of substantially reducing required amount of memory.

According to one embodiment, a convolutional neural network (CNN) method includes the following steps. A temporary buffer layer, which is located between a first layer and a final layer of a CNN system, is determined. Convolutional operations are performed from the first layer to the determined temporary buffer layer of the CNN system in a first stage to generate a feature map line according to partial input data of layers before the temporary buffer layer. Convolutional operations are performed from the temporary buffer layer to the final layer of the CNN system in a second stage to generate a feature map.

DETAILED DESCRIPTION OF THE INVENTION

Figure 1:
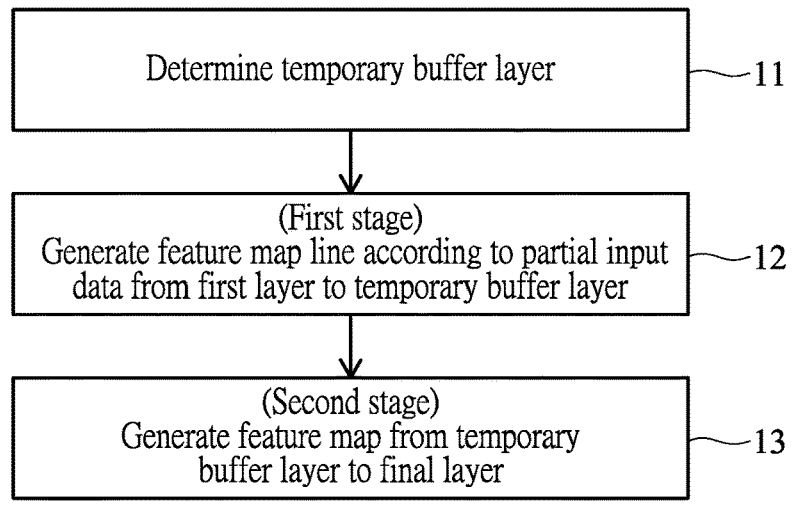
FIG. 1 shows a flow diagram illustrating a two-stage convolutional neural network (CNN) method according to one embodiment of the present invention.
Figure 2A:
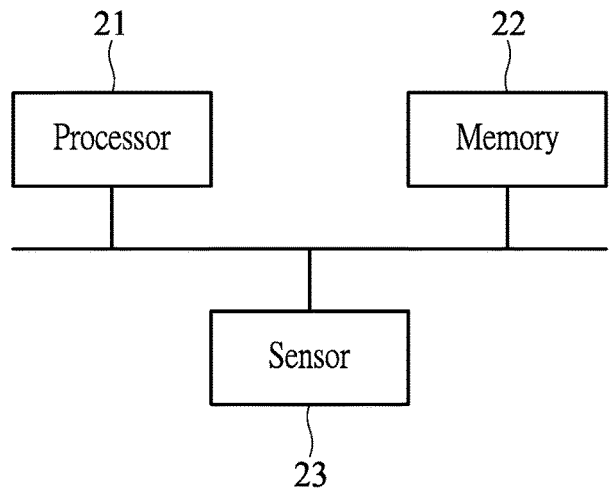
FIG. 2A shows a block diagram illustrating a convolutional neural network (CNN) system with a line-based feature map according to one embodiment of the present invention.

FIG. 1 shows a flow diagram illustrating a two-stage convolutional neural network (CNN) method 100 according to one embodiment of the present invention. FIG. 2A shows a block diagram illustrating a convolutional neural network (CNN) system 200 with a line-based feature map according to one embodiment of the present invention.

In the embodiment, the CNN system 200 may include a processor 21 configured to perform CNN-related or convolutional operations. The CNN system 200 of the embodiment may include a memory 22 configured to store a feature map generated by the processor 21. The memory 22 may be a volatile memory (e.g., static random-access memory or SRAM). The memory 22 may also store instructions executable by the processor 21. The CNN system 200 of the embodiment may include a sensor 23, such as a camera, configured to capture input data (e.g., image data), on which the processor 21 may process.

Figure 2B:
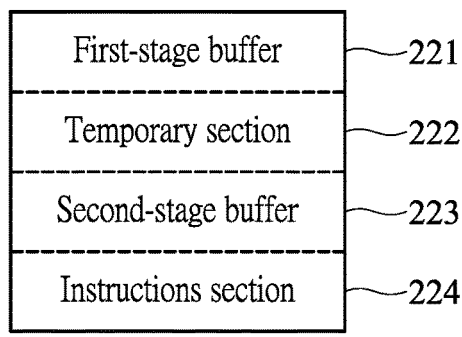
FIG. 2B shows a configuration of the memory of FIG. 2A.

FIG. 2B shows a configuration of the memory 22 of FIG. 2A. In the embodiment, the memory 22 may be partitioned into the following sections: first-stage partial feature map buffer ("first-stage buffer" hereinafter) 221, temporary buffer layer section ("temporary section" hereinafter) 222, second-stage feature map buffer ("second-stage buffer" hereinafter) 223, and instructions section 224 for storing instructions.

Specifically, in step 11, a temporary buffer layer is determined, for example, by an offline optimizer. The temporary buffer layer is located between a first layer and a final layer of the CNN system 200. In general, the layer with a minimum amount of data, including height, width and channel, among all layers of the CNN system 200 may be determined as the temporary buffer layer.

Subsequently, in step 12, the flow goes to a first stage, in which the processor 21 (e.g., CNN hardware accelerator) may perform convolutional operations from the first layer to the determined temporary buffer layer of the CNN system 200. According to one aspect of the embodiment, the processor 21 may generate (or output) a feature map line according to partial input data of layers before the temporary buffer layer, and the partial input data are stored in the first-stage buffer 221. The generated feature map lines respectively associated with different partial input data are stored in the temporary section 222 line by line. It is noted that the time required to perform the convolutional operations in the first stage is the same as in a traditional (frame-based) CNN method, but the memory space for the receptive field is substantially smaller than that in the traditional (frame-based) CNN method.

Figure 3:
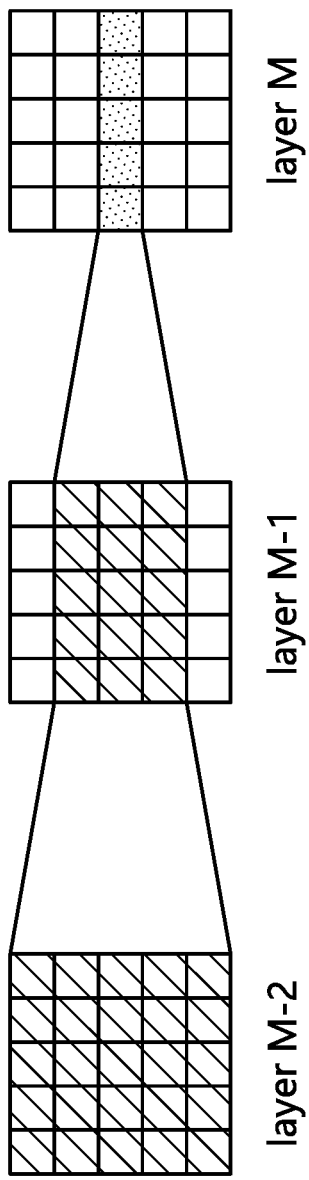
FIG. 3 schematically shows a feature map line of the temporary buffer layer and the partial input data of layers before the temporary buffer layer.

FIG. 3 schematically shows a feature map line (designated by dots) of the temporary buffer layer (e.g., layer M) and the partial input data (designated by slanted lines) to be stored in the first-stage buffer 221 of layers (e.g., layer M−1 and layer M−2) before the temporary buffer layer for filter size of 3×3.

Specifically, the partial input data of layer M−1 may include one (horizontal) line above, one line below and one line corresponding to a feature map line. Similarly, the partial input data of layer M−2 may include two lines above, two lines below and one line corresponding to a feature map line. In other words, the smaller an ordinal number of a layer is, the more partial input data the layer has. If down-sampling is performed between layers, the amount of lines above and lines below the feature map line should be multiplied by a down-sampling ratio. Generally speaking, the partial input data of a layer M−P may include n×P lines above, n×P lines below and one line corresponding to a feature map line for filter size of (2n+1)×(2n+1), wherein the temporary buffer layer is located at layer M, and P is a positive integer less than M.

After the entire input data have been processed and the temporary section 222 has been filled with the generated feature map lines, the flow goes to step 13 to enter a second stage, in which the processor 21 (e.g., CNN hardware accelerator) may perform convolutional operations from the temporary buffer layer to the final layer of the CNN system 200 in a (traditional) layer-to-layer manner (instead of line-by-line manner as in the first stage). In the specification, the layer-to-layer manner means that the convolutional operations (between the temporary buffer layer to the final layer) are performed as in a conventional CNN system. Specifically, the processor 21 may generate (or output) a feature map (but not feature map line) according to entire input data fetched by the processor 21. The generated feature map may be stored in the second-stage buffer 223. It is noted that the sizes of feature maps associated with the layers after the temporary buffer layer would commonly be much smaller than the sizes of feature maps associated with the layers before the temporary buffer layer.

Figure 4:
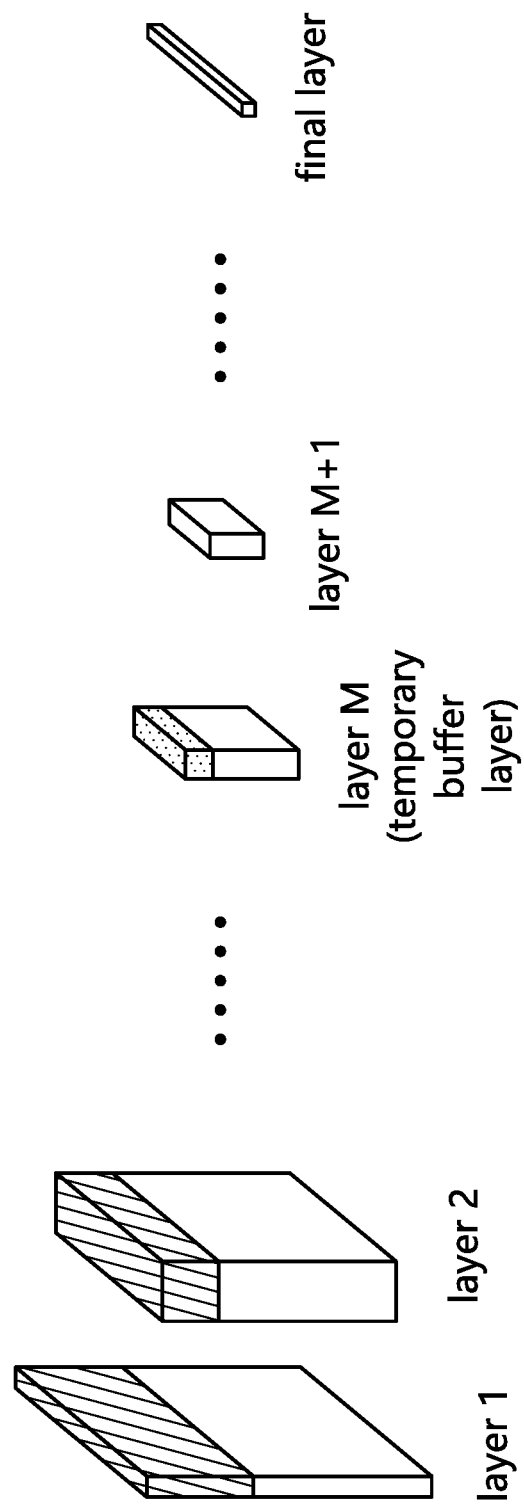
FIG. 4 shows an exemplary CNN system according to one specific embodiment of the present invention.

The embodiment proposed above may be adapted to single shot detector (SSD) such as you only look once. FIG. 4 shows an exemplary CNN system according to one specific embodiment of the present invention. In one embodiment, SRAM size of the first-stage buffer 221 is 174K, the temporary section 222 is 48K, and the second-stage buffer 223 is 48K, compared to 3*520K required in a traditional (frame-based) CNN system, that is, about 80% reduction in SRAM size for the line-based CNN system according to the embodiment of the present invention.

Although specific embodiments have been illustrated and described, it will be appreciated by those skilled in the art that various modifications may be made without departing from the scope of the present invention, which is intended to be limited solely by the appended claims.

What is claimed is:

1. A convolutional neural network (CNN) method, comprising:
    determining a temporary buffer layer, which is located between a first layer and a final layer of a CNN system;
    performing convolutional operations from the first layer to the determined temporary buffer layer of the CNN system in a first stage to generate a feature map line according to partial input data of layers before the temporary buffer layer;
    performing convolutional operations from the temporary buffer layer to the final layer of the CNN system in a second stage to generate a feature map; and
    a memory that is partitioned into the following sections:
        a first-stage buffer for storing the partial input data, a temporary section for storing the generated feature map line in the first stage; and a second-stage buffer for storing the generated feature map in the second stage.

2. The method of claim 1, wherein the temporary buffer layer has a minimum amount of data among all layers of the CNN system.

3. The method of claim 1, wherein the second stage begins after filling up the temporary section of the memory.

4. The method of claim 1, wherein the memory comprises static random-access memory.

5. The method of claim 1, wherein the memory further comprises an instructions section for storing instructions.

6. The method of claim 1, wherein, in the first stage, the smaller an ordinal number of a layer is, the more partial input data the layer has.

7. The method of claim 1, wherein, in the first stage, the partial input data of a layer M-P may include n×P lines above, n×P lines below and one line corresponding to the feature map line for filter size of (2n+1)×(2n+1), wherein the temporary buffer layer is located at layer M, P is a positive integer less than M, M is an integer greater than 2, and n is a positive integer.

8. The method of claim 1, wherein the second stage is performed in a layer-to-layer manner.

9. The method of claim 1, wherein the CNN system comprises a single shot detector.

10. A convolutional neural network (CNN) system, comprising:
    a processor that performs convolutional operations;
    a sensor that captures input data, on which the processor processes;
    a memory that stores instructions executable by the processor;
    wherein the processor performs the following steps:
    determining a temporary buffer layer, which is located between a first layer and a final layer of the CNN system;
    performing convolutional operations from the first layer to the determined temporary buffer layer of the CNN system in a first stage to generate a feature map line according to partial input data of layers before the temporary buffer layer; and
    performing convolutional operations from the temporary buffer layer to the final layer of the CNN system in a second stage to generate a feature map;
    wherein the memory is partitioned into the following sections:
    a first-stage buffer for storing the partial input data;
    a temporary section for storing the generated feature map line in the first stage; and
    a second-stage buffer for storing the generated feature map in the second stage.

11. The system of claim 10, wherein the temporary buffer layer has a minimum amount of data among all layers of the CNN system.

12. The system of claim 10, wherein the second stage begins after filling up the temporary section of the memory.

13. The system of claim 10, wherein the memory comprises static random-access memory.

14. The system of claim 10, wherein the sensor comprises a camera.

15. The system of claim 10, wherein, in the first stage, the smaller an ordinal number of a layer is, the more partial input data the layer has.

16. The system of claim 10, wherein, in the first stage, the partial input data of a layer M-P may include n×P lines above, n×P lines below and one line corresponding to the feature map line for filter size of (2n+1)×(2n+1), wherein the temporary buffer layer is located at layer M, and P is a positive integer less than M, M is an integer greater than 2, and n is a positive integer.

17. The system of claim 10, wherein the second stage is performed in a layer-to-layer manner.

18. The system of claim 10, wherein the CNN system comprises a single shot detector.

* * * * *